(12) United States Patent
Mahler et al.

(10) Patent No.: US 8,531,329 B2
(45) Date of Patent: Sep. 10, 2013

(54) METHOD AND DEVICE FOR DETERMINING THE THICKNESS OF MATERIAL USING HIGH FREQUENCY

(75) Inventors: Michael Mahler, Leinfelden-Echterdingen (DE); Ulli Hoffmann, Nieffern-Oeschelbronn (DE); Reiner Krapf, Reutlingen (DE); Christoph Wieland, Herrenberg-Kuppingen (DE); Felix Wewers, Leverkusen (DE)

(73) Assignee: Robert Bosch GmbH, Stuttgart (DE)

( * ) Notice: Subject to any disclaimer, the term of this patent is extended or adjusted under 35 U.S.C. 154(b) by 1098 days.

(21) Appl. No.: 10/588,183

(22) PCT Filed: Jun. 9, 2005

(86) PCT No.: PCT/EP2005/052660
§ 371 (c)(1),
(2), (4) Date: Aug. 2, 2006

(87) PCT Pub. No.: WO2006/003070
PCT Pub. Date: Jan. 12, 2006

(65) Prior Publication Data
US 2007/0188169 A1  Aug. 16, 2007

(30) Foreign Application Priority Data
Jun. 30, 2004 (DE) .......................... 10 2004 031 626

(51) Int. Cl.
*G01S 13/75* (2006.01)
(52) U.S. Cl.
USPC .......................................................... 342/22

(58) Field of Classification Search
USPC ............................................ 342/22; 324/644
See application file for complete search history.

(56) References Cited

U.S. PATENT DOCUMENTS

| | | | |
|---|---|---|---|
| 3,704,413 A | | 11/1972 | Blevins |
| 3,815,016 A | * | 6/1974 | Nix et al. ................. 324/202 |
| 4,161,731 A | * | 7/1979 | Barr ............................ 342/22 |
| 5,012,248 A | * | 4/1991 | Munro et al. .............. 342/22 |
| 5,434,500 A | | 7/1995 | Hauck et al. |
| 5,576,627 A | | 11/1996 | McEwan |
| 5,835,053 A | * | 11/1998 | Davis ........................... 342/22 |
| 5,835,054 A | * | 11/1998 | Warhus et al. ............ 342/22 |
| 5,904,210 A | * | 5/1999 | Stump et al. ............... 175/45 |

(Continued)

FOREIGN PATENT DOCUMENTS

| | | |
|---|---|---|
| CN | 2038239 | 5/1989 |
| DE | 34 25 811 | 3/1985 |

(Continued)

*Primary Examiner* — Cassie Galt
(74) *Attorney, Agent, or Firm* — Michael J. Striker

(57) ABSTRACT

The present invention relates to a method for determining the thickness of material by penetrating the material, in particular a method for measuring the thickness of walls, ceilings and floors, with which a measurement signal (28) in the gigahertz frequency range emitted using a high-frequency transmitter (24) penetrates the material (10) to be investigated at least once and is detected by a high-frequency receiver (38).
According to the present invention, it is provided that the thickness (d) of the material (10) is measured via at least two transit-time measurements of the measurement signal (28) performed at various positions (20, 22) of the high-frequency transmitter (24) and/or the high-frequency receiver (34).
The present invention also relates to a device system (12; 40, 140, 240, 340) for carrying out the method described above.

11 Claims, 3 Drawing Sheets

(56) References Cited

U.S. PATENT DOCUMENTS

Figure 1:
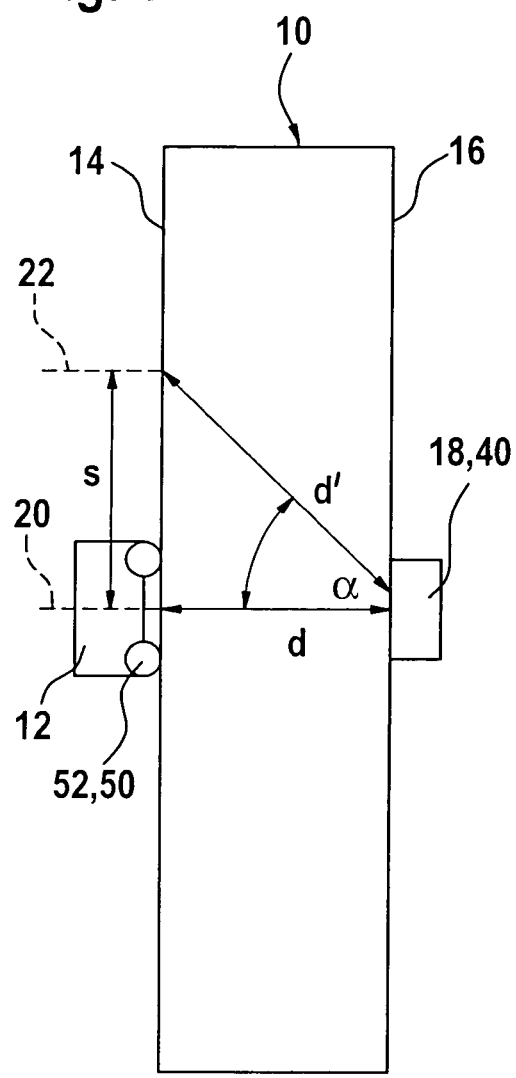

| | | | |
|---|---|---|---|
| 5,929,757 A | | 7/1999 | Sternal et al. |
| 6,005,397 A | * | 12/1999 | Zoughi et al. .................. 324/644 |
| 6,429,802 B1 | * | 8/2002 | Roberts ............................ 342/22 |
| 6,492,933 B1 | * | 12/2002 | McEwan .......................... 342/28 |
| 6,496,136 B1 | * | 12/2002 | Mucciardi ........................ 342/22 |
| 6,501,414 B2 | * | 12/2002 | Arndt et al. ...................... 342/22 |
| 6,531,881 B1 | | 3/2003 | Cordes et al. |
| 6,545,945 B2 | * | 4/2003 | Caulfield ......................... 367/87 |
| 6,778,128 B2 | * | 8/2004 | Tucker et al. .................... 342/22 |
| 7,187,183 B2 | * | 3/2007 | Jonsson et al. ................. 324/642 |
| 7,400,976 B2 | * | 7/2008 | Young et al. ...................... 702/5 |
| 7,605,743 B2 | * | 10/2009 | Skultety-Betz et al. ......... 342/22 |
| 7,956,794 B2 | * | 6/2011 | Skultety-Betz et al. ......... 342/22 |

FOREIGN PATENT DOCUMENTS

| | | |
|---|---|---|
| DE | 34 46 392 | 6/1986 |
| DE | 697 31 644 | 12/2005 |
| DE | 102004056393 A1 * | 5/2006 |
| EP | 0 829 020 | 3/1998 |
| GB | 2 307 811 | 6/1997 |
| JP | 1-184020 | 7/1989 |
| JP | 4-19512 | 1/1992 |
| JP | 4-286983 | 10/1992 |
| JP | 5164539 | 6/1993 |
| JP | 11-503229 | 3/1999 |
| JP | 2000-2762 | 1/2000 |
| JP | 2000508056 | 6/2000 |
| WO | 96/30771 | 10/1996 |
| WO | 97/16700 | 5/1997 |

* cited by examiner

METHOD AND DEVICE FOR DETERMINING THE THICKNESS OF MATERIAL USING HIGH FREQUENCY

The invention described and claimed hereinbelow is also described in PCT/EP 2005/052660, filed on Jun. 9, 2005 and DE 102004031626.0, filed Jun. 30, 2004. This German Patent Application, whose subject matter is incorporated here by reference, provides the basis for a claim of priority of invention under 35 U.S.C. 119 (a)-(d).

The present invention relates to a method and a device for determining the thickness of material by penetrating the material, in particular a method and a device for measuring the thickness of walls, ceilings and floors.

BACKGROUND INFORMATION

Publication U.S. Pat. No. 5,434,500 makes known a magnetic field generator that includes a detector with a position indicator, with which the magnetic field generator serves as a sending unit that is placed on a first side of a wall at the point to be located and creates a magnetic field at this point. The associated detector serves as a receiving unit and is moved over the surface of the wall facing away from the sending unit. The receiving unit includes two pairs of two detectors each that measure the relative strength of the magnetic field. By measuring this relative strength of the magnetic field at each of the individual detectors, it is possible to locate the position of the magnetic field generator and/or the projection of this position on the side of the wall opposite from the generator. With the device described in U.S. Pat. No. 5,434,500, the strength of the detected magnetic field is visualized using an optical display. When the strength of the detected magnetic field is equal at all four detection elements, the receiving unit is located directly opposite the sending unit. A quantitative measurement of the wall thickness is not provided for with the device described in U.S. Pat. No. 5,434,500, however.

Publication DE 34 46 392 A1 makes known a method for identifying a test point on one side of a wall, from the other side of the wall. With this method, which is used with metallic walls of a container in particular, it is provided—in order to more quickly identify the test point and increase the accuracy of the position identification—that a magnetic pole is placed on the wall at the test point, and that the magnetic field of the magnetic pole penetrating the wall is detected on the opposite side of the wall from the magnetic pole. To detect the magnetic field, a Hall effect component is preferably used with the method described in DE 34 46 392 A1.

The devices known from the related art have the disadvantage, among others, that metallic parts in the material, e.g., a wall, ceiling or floor, such as steel girders or reinforcing rods, greatly interfere with the detection and can even render it impossible to carry out. In addition, the positioning accuracy of devices of this type tends to be poor.

The object of the present invention, therefore, is to provide a method and a device that allow material thickness to be determined quickly, reliably and precisely.

The object is attained according to the present invention by a method having the features of Claim 1. The object is also attained by a device having the features of Claim 9.

Advantages of the Invention

The method according to the present invention for determining the thickness of a material by penetrating the material, in particular a method for measuring the thickness of walls, ceilings and floors, uses a high-frequency transmitter that emits a measurement signal in the gigahertz frequency range into the material to be investigated, so that the measurement signal penetrating the material can be detected by a high-frequency receiver. The thickness of the material is determined via at least two transit-time measurements of the measurement signal performed at various positions of the high-frequency transmitter and/or the high-frequency receiver.

This evaluation method for determining material thickness makes it possible to determine wall thickness, even if the thickness and/or material properties of the wall, e.g., the dielectric constants of the wall material, are not known.

Due to the high-frequency method used, the wall thickness can be determined with great accuracy, since the positioning accuracy can be increased via the frequency range used. Foreign objects embedded in the wall, e.g., steel girders or reinforcing rods, do not hinder the determination of the wall thickness.

Advantageous refinements of the inventive method and the device system for carrying out this method result from the features indicated with the subclaims.

Advantageously, during the measurement, the high-frequency transmitter and the high-frequency receiver are located on a first surface of the material to be investigated, and the measurement signal from the high-frequency transmitter penetrating the material is reflected back to the high-frequency receiver using an active or passive reflector means placed on a second surface of the material.

In a particularly advantageous embodiment of the method according to the present invention, the high-frequency transmitter and the high-frequency receiver are operated in the same device, in particular in a hand-held, high-frequency measuring device.

In an embodiment of the method according to the present invention, the high-frequency measuring device is moved over a surface of the material to be investigated, to record the at least two transit-time measurements. The displacement path covered by the measuring device is detected by a displacement sensor system and provided to an evaluation unit.

Advantageously, the reflector means includes at least one transponder for returning the measurement signal. This transponder receives the material-penetrating high-frequency signal and returns a corresponding signal to the high-frequency receiver.

Advantageously, the material-penetrating measurement signal is produced using a pulsed-radar method in the gigahertz frequency range and is subsequently launched into the material. One or more measurement frequencies are located in an interval of one gigahertz to 5 gigahertz, and preferably in an interval of 1.5 GHz to 3.5 GHz.

A device system for carrying out the method according to the present invention advantageously includes at least one high-frequency measuring device capable of being placed on a surface of a material, with at least one high-frequency transmitter and one high-frequency receiver, and a transponder capable of being moved relative to this high-frequency measuring device. The high-frequency measuring device, which functions as a pulse reflectometer, transmits measurement signals with a frequency in the gigahertz range through the material to be measured. These measurement signals are detected by a transponder and are optionally processed further. The transponder subsequently returns corresponding measurement signals to the high-frequency receiver of the high-frequency measuring device. The transit time of these measurement signals "reflected" by the transponder is evaluated. Based on at least two different transit-time measurements performed at two different locations on the material, the wall thickness of the material is advantageously determined without knowledge of the material properties, in particular without knowledge of the dielectric constants. In addition to the transit times of the measurement signals detected by the high-frequency measuring device, the displacement path of the high-frequency measuring device between the at least two positions of the at least two transit-time measurements is detected and evaluated.

For this reason, the high-frequency measuring device advantageously includes a position-detection system that detects the path covered by the measuring device is between two measurement points and transmits it to an evaluation and control unit of the measuring device. A position-detection system of this type can record the displacement path, e.g., using rollers or wheels on the housing of the measuring device. With the signal evaluation method, the distance covered by the pulse reflectometer between two measurement points is used to determine the wall thickness of the material being investigated via the transit time of the measurement signal between the pulse reflectometer and the transponder at at least two different points on the material being investigated.

The inventive method and the inventive device for carrying out the method therefore advantageously make it possible to determine wall thickness, even without knowledge of the wall thickness and, in particular, without knowledge of the material properties of the wall. The devices required for this are a high-frequency measuring device, e.g., a pulse reflectometer-based locating device for use on a wall, and a transponder or an equivalent reflector means.

Further advantages of the inventive method and the inventive device are illustrated in the drawings, below, and in the associated description of advantageous embodiments.

DRAWING

The drawings depict embodiments of the inventive method and the inventive device system for determining the thickness of material by penetrating the material; they are explained in greater detail in the subsequent description. The figures in the drawings, their description and the claims contain numerous features in combination. One skilled in the art will also consider these features individually and combine them to form further reasonable combinations, which are therefore also disclosed in the description.

Figure 2:
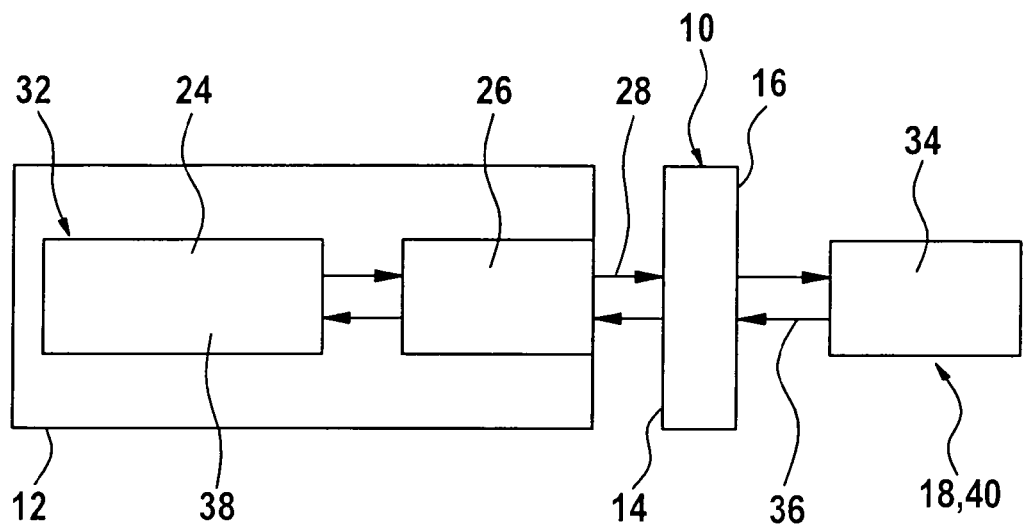
Figure 3:
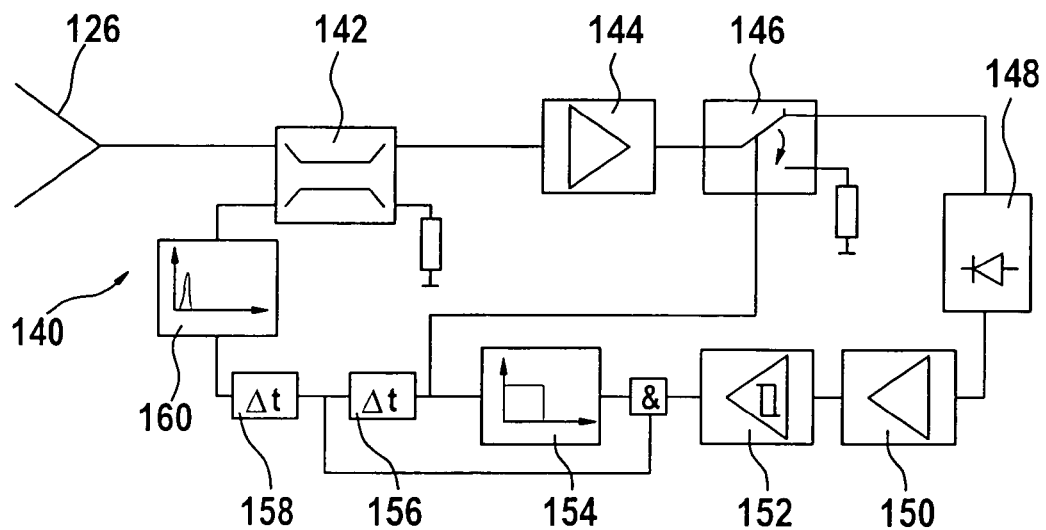
Figure 4:
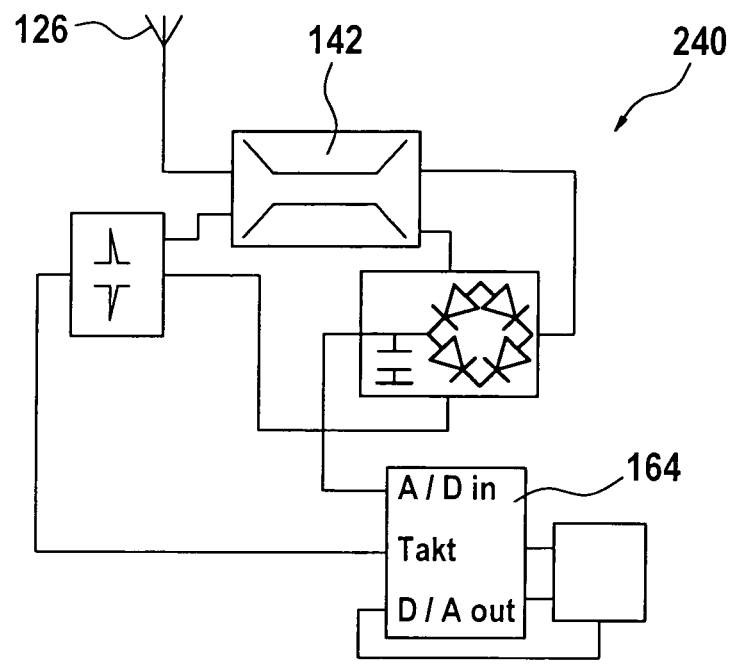
Figure 5:
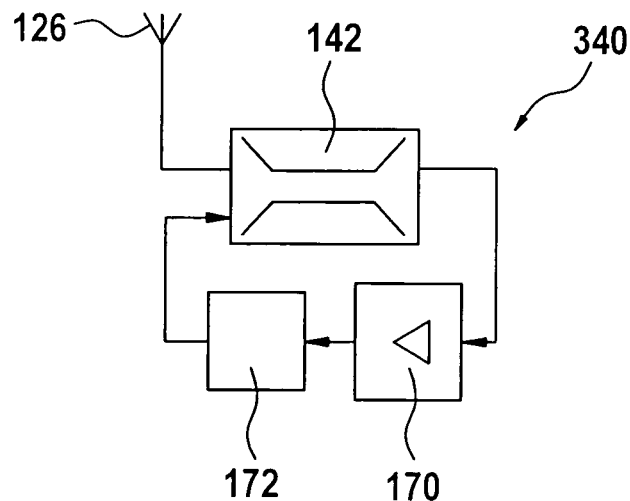

FIG. 1 shows a schematic illustration of the measurement system underlying the method according to the present invention FIG. 2 shows a schematic illustration of the inventive method for a first measurement location, FIG. 3 shows a first exemplary embodiment of the principal electronic components of a transponder for the inventive method, FIG. 4 shows an alternative realization of a transponder for the inventive method, FIG. 5 shows a further realization of a transponder of the inventive method, in a schematic illustration.

DETAILED DESCRIPTION OF THE EXEMPLARY EMBODIMENTS

FIG. 1 shows a typical measurement situation that underlies the inventive method. The objective is to determine material thickness d of a material 10, e.g., a wall, floor or a ceiling, without any special knowledge of the material properties, e.g., the dielectric constants of material 10.

With the aid of a high-frequency measuring device 12, which is operated as a pulse reflectometer and is placed on a surface 14 of workpiece 10 to be investigated, a measurement signal in the gigahertz frequency range is transmitted through material 10 to be investigated and is returned—to a receiving unit of high-frequency measuring device 12 in a manner to be described below—via a transponder 18 located on surface 16 of the material to be investigated opposite from high-frequency measuring device 12. The path covered and, therefore, the thickness of the material, can be deduced from the transit time of the measurement signal. To do this, the propagation speed of the measurement signal in the material must be known. This, in turn, depends on the material properties and, in particular, on the dielectric constants of the material.

When the transit time of the signal between high-frequency measuring device 12 and transponder 18 is now measured and evaluated for at least two different measurements at two different but known locations 20 and 22 of the high-frequency measuring device, wall thickness d can be determined based on geometric relationships, without the need to know the material constants.

FIG. 2 depicts a few of the principal method steps of the inventive method based on a depiction of the measurement situation at a first measurement site 20. A high-frequency unit 32 of high-frequency measuring device 12—which is composed of at least one high-frequency transmitter 24 and one high-frequency receiver 38—creates microwaves in the gigahertz frequency range, e.g., using FMCW or a pulsed-radar method. HF transmitter 24 can generate one or more individual frequencies (FMCW method) or one broadband pulse spectrum (pulse radar). Measurement signal 28 is in the gigahertz frequency range, with measurement frequencies that are typically in an interval of one gigahertz to 5 gigahertz. Preferably, one or more measurement frequencies from a frequency interval of 1.5 GHz to 3.5 GHz are used with the method according to the present invention.

With the inventive method, high-frequency measuring device 12 is held or attached to surface 14 of the material on one side of the material. High-frequency measuring device 12 includes a high-frequency transmitter 24 with an aerial system 26 that preferably points in the direction of material 10 and can emit a high-frequency measurement signal 28 into material 10. The microwave signals generated in this manner—which are measurement signal 28—are emitted via aerial system 26, which includes at least one aerial. If high-frequency measuring device 12 is placed on one side 14 of material 10, e.g., a wall, ceiling or floor, at a defined point 20, the microwaves—as directed high-frequency signal 28—penetrate the wall and can be detected by a receiver 34 of a reflector means 18 on the other side 16 of material 10.

Reflector means 18 sends a return measurement signal 28—that has been shifted by an internal transit time—back through the wall to high-frequency measuring device 12.

High-frequency measuring device 12, which is designed as a high-frequency transmitter 24 and as a high-frequency receiver 38, detects return measurement signal 36 sent by reflector 18 using a receiving aerial. A single high-frequency aerial element 26 can be used as the sending and receiving aerial of high-frequency measuring device 12, when wired accordingly. In further embodiments of the present invention, a separate arrangement of sending aerial and receiving aerial can be provided for high-frequency measuring device 12.

Reflector means 18 are located on side 16 of material 10 opposite from high-frequency measuring device 12, reflector means 18 returning—in an active or passive manner—measurement signal 28 penetrating wall 10 as a return measurement signal 36 to a receiving unit of high-frequency measuring device 12. A reflector means 18 of this type can be a passive reflector, e.g., a SAW (Surface Acoustic Wave) element. Measurement signal 36 returned by reflector means 18 can be located in the same frequency range or in a frequency range that has been shifted toward incoming measurement signal 28.

A transponder 40 can be used advantageously as reflector means 18; transponder 40 detects and processes measurement signal 28 penetrating material 10 and, after an internal delay time, it returns measurement signal 28—which correlates with detected, original measurement signal 28—back through material 10.

FIG. 3 shows a first possible embodiment of a transponder of this type for the inventive method. High-frequency alternating field created by measuring device 12 penetrates a material 10, e.g., a wall to be investigated. A transponder 140 is located on the side of this wall opposite from measuring device 12 that locates and detects the signals created by the measuring device and returns them to the measuring device in a manner to be described below.

After a certain internal and, therefore, known transit time, a transponder of this type generates a new signal, which it emits via a separate aerial, e.g., in the ISM band, at a frequency of 2.45 GHz. This newly generated signal penetrates the wall again and can be detected by high-frequency receiver 38 of measuring device 12.

In this manner, with the aid of measuring device 12—which is a pulse reflectometer—a minimum transit time of the new signal transmitted by the transponder can be found, and the corresponding point on the wall can be marked, for example. A marking unit can be located on measuring device 12 and on transponder 140. The determination of the wall thickness can be carried out by evaluating the transit time between the reflectometer, i.e., measuring device 12 and transponder 140.

The basic design of a transponder of this type will be described below. Various types of high-frequency receivers are suitable for use as receivers in the transponder, e.g., power detectors, which evaluate the power level of the characteristic measurement signal of measuring device 12, or pulse detectors, which can detect the typical field changes of measuring device 12.

FIG. 3 shows the possible design of a transponder 140 of this type using a block diagram. The signal received by transponder 140 via an aerial unit 126 is directed via a coupler 142 or a circulator to a receiving amplifier 144. After it is amplified, the signal reaches a pulse detector 148 via a HF switch 146, which has been switched to the sleep state. Pulse detector 148 delivers an output voltage that is proportional to the input power. The voltage of pulse detector 148 is amplified in a low-frequency amplifier 150. In a downstream comparator 152, a digital signal is generated from the analog voltage signal. In a monoflop 154, the relatively short comparator signal is brought to a defined length. This signal is used—with the aid of time-delay units 156 and 158—to blank the receiving state and generate transmitted pulses. The signal created by transmitted pulse generator 160 is brought back via coupler 142 or a circulator to aerial device 126, and it is returned through the wall being investigated to measuring device 12.

FIG. 4 shows an alternative realization of a transponder 240. A sampler is used in this case. The control cycle of the sampler is regulated by a microcontroller 164 such that a maximum voltage occurs at the output of the sampler. Once this maximum of the output signal has been reached, the microcontroller cycle and the cycle of the measuring device 12 run in synchronicity, although shifted by the transit time of the measurement signal. In this manner it is possible to locate penetration site of the measurement signal and perform a measurement of the wall thickness. Since the signal that controls the sampler is also sent directly, the response from the transponder takes place with minimal delay.

A further alternative of the basic design of a transponder for the inventive method is shown in FIG. 5 in a simplified manner. With the concept shown in FIG. 5, the received measurement signal is amplified in transponder 340 by an amplifier 170 and, after a certain time delay that is realized by a delay unit 172, it is sent out again via coupler 142 and aerial unit 126 in the manner of a loop amplifier.

In addition to the design and mode of operation of a transponder, described above, for the inventive method, it is also possible to add on to the transponder, e.g., with an AC sensor (50 Hz sensor) and/or an inductive sensor. An additional functionality of the transponder of this type makes it possible for the operator to also prevent damaging, e.g., a current lead, on the side, e.g., of a wall, opposite from measuring device 12.

The information is advantageously evaluated by high-frequency locating device 12, which can be switched to the receiving mode using suitable software or hardware wiring and thereby display, e.g., the position of a hole, and the wall thickness.

A locating device that operates using high frequency of the type described, e.g., in application DE 102 07 424 A1 from the applicant, can be used advantageously as the high-frequency locating device.

To determine a first measurement location 20, the transit time between high-frequency measuring device 12 and a transponder, which is installed, e.g., in one of the forms 40, 140, 240, 340 shown, is evaluated. Measuring device 12 or the transponder are moved over a surface of the material until a mininum transit time from measuring device 12 to the transponder and back to measuring device 12 results. In this manner, with the aid of measuring device 12—which is a pulse reflectometer—the minimum transit time of the measurement signal can be found, and the corresponding point on the wall can be marked, for example. Since the dielectricity constant of the material 10 is not known, thickness d of material 10 cannot be determined directly from this detected, minimum transit time, so a second measurement is performed at another measurement location 22.

When a measurement is carried out—according to the present invention—to determine material thickness d, high-frequency measuring device 12 is moved over the surface of material 10, e.g., a wall. High-frequency measuring device 12 includes a position-detection system 50 that transmits distance s covered by the measuring device via displacement sensors to a control and evaluation unit of the measuring device. To this end, high-frequency measuring device 12 includes rolling bodies that are configured, e.g., in the form of wheels 52, and are a displacement sensor system for distance s covered by high-frequency measuring device 12 on the surface of the wall.

With the inventive method, a second measurement is performed at a second measurement location 22, which is separated from first measurement location 20 by a distance s, in the case of which a measurement signal 28 is sent through material 10, detected by the transponder, returned as return measurement signal 36, and detected and analyzed by measuring device 12. When the transit time of the measurement signal between the high-frequency measuring device serving as pulse reflectometer and the transponder is evaluated for at least these two measurements at measurement locations 20 and 22, wall thickness d can be deduced; this will be explained briefly below. The following mathematical relationship applies for thickness d of material 10 (see FIG. 1):

$$d = s/\tan \alpha \qquad (1)$$

where s is the distance between two measurement locations, and a is the angle between the two measurement locations and the transponder placed on diametrically opposed side 16 of the material.

In addition, the following applies for the right triangle formed by the two measurement locations 20, 22 and the position of the transponder:

$$d' = s/\sin \alpha \text{ and} \quad (2),$$

$$\cos \alpha = d/d' \quad (3)$$

Transit time $t_L$ of measurement signal 28 between high-frequency measuring device 12 and the transponder depends on dielectricity constant $\in_r$ and path L covered by the measurement signal. The following therefore applies:

$$t_L = L * c_0 / \sqrt{\in_r}$$

where $c_0$=the speed of light. Dielectric losses in material 10 can be disregarded, since they only dampen the signal and do not affect the velocity of propogation of the signal ($c_0/\sqrt{\in_r}$)

Since neither the wall thickness d nor the dielectricity constant $\in_r$ of material 10 are known with the inventive method, the following approach can be used. When considering two different paths through material 10 resulting from the fact that measurements are performed at two different measurement locations 20 and 22, two different transit times are obtained for the particular measurement signal, depending on the distance covered and the dielectricity constants, even though they are constant for both measurements and are considered to be constant. The following therefore applies:

$$t_{L20} = d * c_0 / \sqrt{\in_r} bzw. t_{L22} = d' * c_0 / \sqrt{\in_r} \quad (5)$$

and

Equations (5) result in equation (6):

$$\cos \alpha = t_{L20}/t_{L22} \quad (6)$$

so, the desired material thickness of material 20 represented by equation (1) is calculated as follows:

$$d = \frac{s}{\tan(ar \cos(t_{L20}/t_{L22}))} \quad (7)$$

Wall thickness d is therefore calculated based on displacement path s of the high-frequency measuring device between measurement locations 20 and 22 and the transit time of signals $t_{L20}$ and $t_{L22}$ between the high-frequency measuring device and the transponder. The transmit times can therefore be determined precisely, since the transmit time of the signals is composed of the transit time through wall 10 and an internal transit time in the transponder resulting from signal processing. The time in the transponder depends on the circuitry, and is known. Transit times $t_{L20}$ and $t_{L22}$ through material 10 can therefore be determined from the transit time measured with the device according to the present invention.

Advantageously, the inventive method makes it possible to determine the thickness of a wall by evaluating the transit time between the high-frequency measuring device and a transponder. The transponder includes an economical circuit for detecting very small and temporally short high-frequency pulses, and for reproducibly transmitting an actively generated "reflex pulse" with a comparable spectrum.

The inventive method and the inventive device for carrying out this method are not limited to the embodiments shown in the exemplary embodiments.

What is claimed is:

1. A method for determining the thickness of material by penetrating the material, in particular a method for measuring the thickness of walls, ceilings and floors, with which a measurement signal (28) in the gigahertz frequency range emitted using a single high-frequency transmitter (24) penetrates the material (10) to be investigated at least once and is detected by a single high-frequency receiver (38),
    wherein the thickness (d) of the material (10) is measured via at least two transit-time measurements of the measurement signal performed for various positions (20, 22) of the single high-frequency transmitter (24) and the single high-frequency receiver (34) operated in a same hand-held device.

2. The method as recited in claim 1, wherein the high-frequency transmitter (24) and the high-frequency receiver (38) are operated on a first surface (14) of the material (10), and the measurement signal (28) from the high-frequency transmitter (24) is reflected back to the high-frequency receiver (38) by a reflector means (18).

3. The method as recited in claim 2, wherein, the reflector means (18) includes a transponder (40, 140, 240, 340).

4. The method as recited in claim 1, wherein the measuring device (12) is moved over a surface (14) of the material to record the at least two transit-time measurements.

5. The method as recited in claim 4, wherein, the displacement path (s) of the measuring device (12) is detected.

6. The method as recited in claim 1, wherein the measurement signal (28) is generated in the gigahertz frequency range using a pulsed-radar method and is launched into the material (10).

7. The method as recited in claim 1, wherein one or more measurement frequency/frequencies (28) are used in an interval of 1000 MHz to 5000 MHz, and preferably in an interval of 1500 MHz to 3500 MHz.

8. A device system for carrying out the method as recited in claim 1, wherein the device includes at least one high-frequency measuring device (12) capable of being placed on a surface (14) of a material (10), with at least one high-frequency transmitter (24) and a high-frequency receiver (38), and a transponder (40, 140, 240, 340) capable of being moved relative to this high-frequency measuring device.

9. The system as recited in claim 8, wherein the at least one high-frequency measuring device (12) includes a position-detection system (50, 52) for recording a path (s).

10. A method for determining the thickness of material by penetrating the material, in particular a method for measuring the thickness of walls, ceilings and floors, with which a measurement signal (28) in the gigahertz frequency range emitted using a single high-frequency transmitter (24) penetrates the material (10) to be investigated at least once and is detected by a single high-frequency receiver (38), wherein the thickness (d) of the material (10) is measured via at least two transit-time measurements of the measurement signal performed for various positions (20, 22) of the single high-frequency transmitter (24) and the single high-frequency receiver (34), wherein the single high-frequency transmitter (24) and the single high-frequency receiver (38) are operated on a first surface (14) of the material (10), and the measurement signal (28) from the single high-frequency transmitter (24) is reflected back to the single high-frequency receiver (38) by a transponder (18) located on a second surface (16) of the material (10).

11. A method for determining the thickness of material by penetrating the material, in particular a method for measuring the thickness of walls, ceilings and floors, with which a measurement signal (28) in the gigahertz frequency range emitted using a single high-frequency transmitter (24) penetrates the material (10) to be investigated at least once and is detected by a single high-frequency receiver (38),
- wherein the thickness (d) of the material (10) is measured via at least two transit-time measurements of the measurement signal performed for various positions (20, 22) of the single high-frequency transmitter (24) and the single high-frequency receiver (34) operated in a same hand-held device; and
- wherein the high-frequency transmitter (24) and the high-frequency receiver (38) are operated on a first surface (14) of the material (10), and the measurement signal (28) from the high-frequency transmitter (24) is reflected back to the high-frequency receiver (38) by a reflector means (18).

* * * * *